March 5, 1968   J. BELART ETAL   3,371,752
CAPSULED ACTUATOR FOR DISC BRAKES
Filed March 1, 1965   2 Sheets-Sheet 1

United States Patent Office 3,371,752
Patented Mar. 5, 1968

3,371,752
CAPSULED ACTUATOR FOR DISC BRAKES
Juan Belart, Walldorf, Fritz Ostwald, Buchschlag, and Karl Schlör, Biebesheim, Germany, assignors to Dunlop Rubber Company Limited, Erdington, England, a corporation of Great Britain
Filed Mar. 1, 1965, Ser. No. 435,919
8 Claims. (Cl. 188—106)

This invention relates to disc brakes, and is particularly concerned with operating mechanisms for disc brakes.

According to the invention, an operating mechanism for a disc brake comprises an expander device mounted in a sealed capsule, the capsule having opposite end walls which are relatively axially movable to permit expansion of the expander device.

The invention also provides a disc brake having an operating mechanism as defined above, and in a preferred embodiment of the invention the expander device is of the ball-and-ramp type.

The operating mechanism according to the invention, preferably includes a hydraulic brake-operating mechanism mounted between the expander device and the associated limb of a brake caliper, the expander device being arranged to transmit the thrust from the hydraulic brake-operating device to an associated friction element to enable the brake to be applied by the hydraulic mechanism, and an automatically adjusted reaction member being provided for the expander device to enable it to be operated at all stages of friction pad wear.

The brake operating mechanism according to the invention is particularly suitable for the kind of disc brake in which one friction element is secured to one limb of an axially movable caliper, on one side of the disc, and in which a second friction element is axially movable relative to the caliper and into engagement with the disc by a brake operating mechanism mounted between the movable friction element and the associated limb of the caliper, on the opposite side of the disc. In this arrangement the friction element fixed to a limb of the caliper is moved into engagement with the disc by the reaction on the caliper resulting from the thrust generated by the brake operating mechanism to press the movable friction element against the disc.

Figure 1:
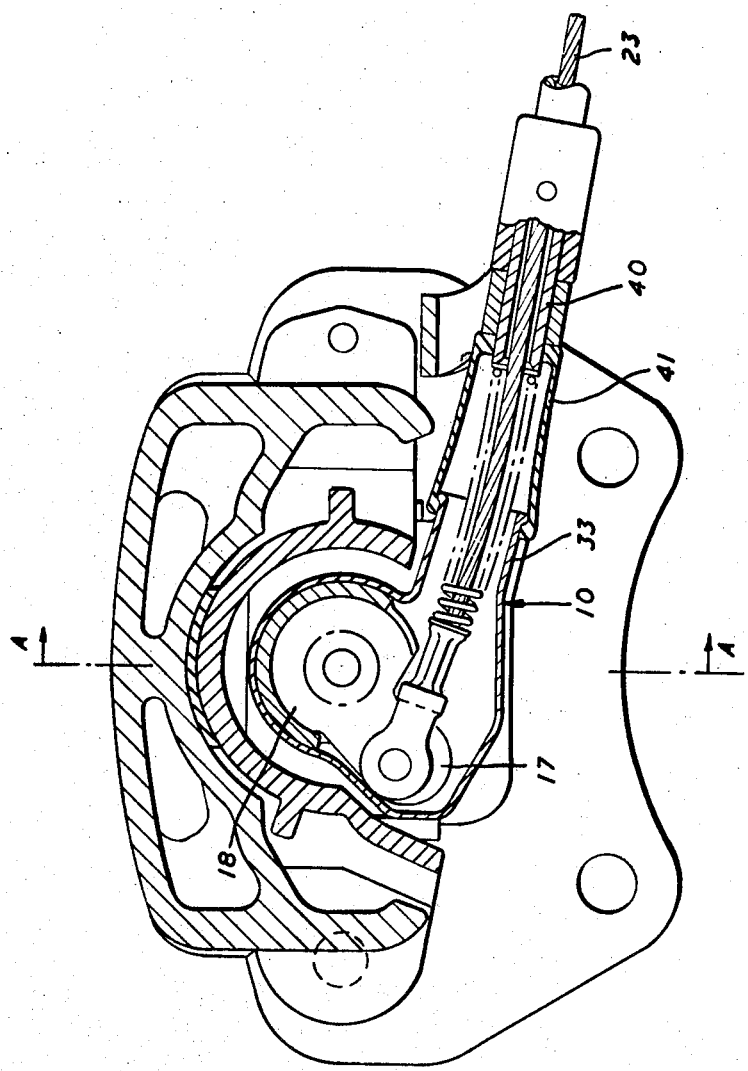
Figure 2:
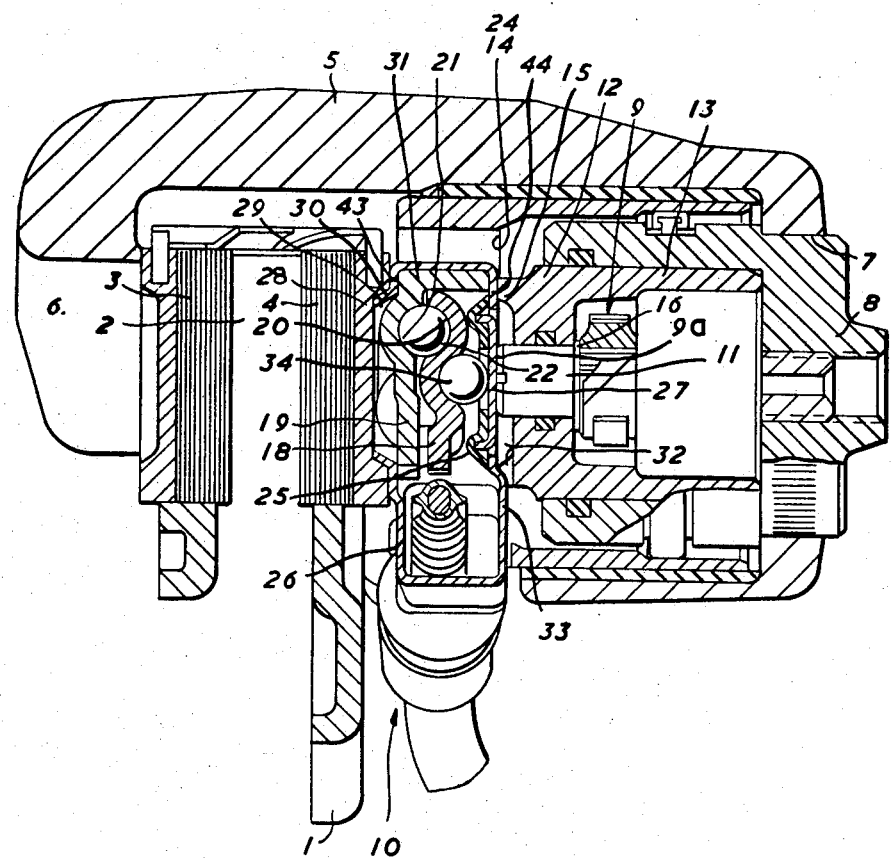

One embodiment of the invention will now be described, by way of example, with reference to the accompanying drawings, in which:

FIGURE 1 is a cross-sectional end view of part of a disc brake viewed in the axial direction, and FIGURE 2 is an axial cross-sectional view of the disc brake taken on the line A—A of FIGURE 1.

The disc brake shown in the drawings comprises a non-rotatable brake support bracket 1, a brake disc 2, friction elements 3 and 4 and an axially movable caliper 5. The friction elements 3 and 4 are located against movement parallel to the braking surfaces of the disc 2 in apertures formed in the brake support bracket 1, which is of U-shaped cross-section and is bent around the outer periphery of the disc 2 to provide support for the friction elements on both sides of the disc.

The caliper 5 comprises a limb 6 to which the friction element 3 is rigidly secured, and a second limb, on the opposite side of the disc, to which is secured a brake operating mechanism comprising a hydraulic operating cylinder 8 and a manually actuated expander device 10. The cylinder 8 is fixed in a bore 7 of the caliper, and extends axially towards the friction element 4, the caliper 5 being axially slidable on a cylindrical guide sleeve attached to the brake support bracket and surrounding the brake operating mechanism.

The piston 12 within the cylinder 8 has a rib 15 which engages the expander device 10, the arrangement being such that the thrust developed within the hydraulic cylinder 8 forces the piston 12 to the left as seen in FIGURE 2, and applies a thrust to the expander device 10. The device 10 transmits the thrust to the friction element 4 to press the element 4 into engagement with the disc 2. The resultant reaction on the cylinder 8 moves the caliper 5 to the right as seen in FIGURE 2, thus drawing the friction element 3 into engagement with the opposite side of the disc.

The adjustment device 9 comprises a bolt 11 which is disposed axially within the cylinder 8. The bolt 11 is screwed into the end of the cylinder 8, and has an abutment face 9a which is engageable by the thrust device 10. The bolt 11 passes through a sealed bore in the end 12 of the piston 13 and projects so that the face 9a is level with the face 14 of the rib 15 when the piston is resting against a stop 16 formed on the adjustment bolt.

The adjustment device 9 comprises an automatic adjustment mechanism which moves the bolt 11 towards the disc as the friction elements wear, thus providing an automatically adjusted reaction member for the manual brake actuating device 10.

The manual actuating device 10 is enclosed within a capsule 26 which prevents dirt or moisture entering the mechanism. The operating mechanism within the capsule 26 comprises a pressure plate 18, integral with and rotatable by a lever 17 connected to a brake operating cable 23, and a thrust plate 19. The plates 18 and 19 each have three ramped recesses, 20 and 21 respectively, which contain balls 22 held between confronting recesses in the two plates, the arrangement being such that when the pressure plate 18 is rotated relatively to the thrust plate 19 by the lever 17 the balls 22 ride up the ramps of the recesses and move the pressure plate 18 and thrust plate 19 apart. The thrust plate 19 engages one end wall 43 of the capsule 26, and the pressure plate 18 contains a central ball 34 which rests against a cover plate 27 in the other end wall 44 of the capsule which is axially movably connected and sealed to the remainder of the capsule by a flexible diaphragm 25.

The expander device includes an axially extending member 31 formed integrally with the thrust plate 19 which stiffens the capsule 26 to enable it to resist the compressive force exerted on it when the hydraulic cylinder is operated to apply the brake, the member 31 being aligned with the rib 15 and the part of the capsule in engagement with the annular portion of the backing plate 28 which surrounds a recess 29, into which an outwardly turned lip 30 on the capsule is fitted. The capsule has a projecting portion 33 which passes through an opening 32 in the rib 15 of the piston 13 and is sealed to the cable sheath 40 by a rubber sleeve 41.

In operation of the brake described above the capsule 26 serves to protect the device 10 against corrosion, etc., whilst permitting the thrust load developed on the ball 34 to be transmitted to the abutment face 9a and correspondingly to the friction element 4. The whole device 10 can easily be removed, in the capsule 26, when replacement of the friction elements is required.

Having now described our invention, what we claim is:

1. An operating mechanism for a disc brake having a hydraulic actuator, and comprising an expander device disposed between said hydraulic actuator and the disc portion of said disc brake to provide a thrust connection therebetween, means forming a sealed capsule which surrounds said expander device and which can be inserted in and removed from the associated brake structure as a unit, said capsule having opposite end walls which are relatively axially movable to provide expansion of said expander device to effect brake operation independently of said hydraulic actuator.

2. An operating mechanism according to claim 1 wherein said expander device includes a ball-and-ramp for effecting spreading movement of said device.

3. An operating mechanism according to claim 1 wherein one of the end walls of said capsule has an axially-extending portion which is substantially rigid and the other of said end walls incorporates a flexible portion operatively secured to the rigid portion of said other end wall to provide the axial movement of said end walls.

4. An operating mechanism according to claim 3 wherein said flexible portion is comprised of a flexible diaphragm.

5. A disc brake comprising a rotatable disc and a nonrotatable caliper axially movable relative to one another, said caliper having a pair of limbs straddling a periphery of said disc, a friction element fixed to one limb of the caliper and a movable friction element mounted on the other limb so as to be movable axially relative to the caliper to engage the disc, and an encapsulated removable operating mechanism proportioned to be axially disposed between the movable friction element and the associated limb of the caliper, said operating mechanism comprising a sealed capsule having seal-forming opposite end walls which are axially movable relative to one another and an expander device within said capsule, said expander device including a thrust plate associated with one end wall and a pressure plate associated with the other end wall, a thrust bearing between said pressure plate and its associated end wall, said pressure plate and thrust plate having pairs of confronting ramped recesses, and coacting balls mounted between the pressure plate and thrust plate, one ball being inserted in each pair of ramped recesses, and a lever for rotating the pressure plate relative to the thrust plate.

6. A disc brake according to claim 5 including a hydraulic brake-operating mechanism mounted between said expander device and the associated limb of the caliper, said expander device being arranged to transmit thrust from the hydraulic brake-operating device to said friction elements.

7. A disc brake according to claim 5 wherein the expander device is demountably disposed between one limb of the caliper and the associated friction element for removal independently of said friction element.

8. A disc brake according to claim 7 including an automatic adjustment device provided between said expander device and the associated limb of the caliper, said adjustment device having an abutment surface for the expander device having a rigid connection to said caliper and arranged to advance said abutment surface progressively towards the disc to compensate for friction pad wear.

References Cited

UNITED STATES PATENTS

| 2,820,530 | 1/1958 | Chovings et al. | 188—73 |
| 3,211,263 | 10/1965 | Harrison | 188—72 X |

FOREIGN PATENTS

| 1,346,802 | 11/1963 | France. |
| 957,504 | 5/1964 | Great Britain. |
| 962,153 | 7/1964 | Great Britain. |

MILTON BUCHLER, *Primary Examiner.*

FERGUS S. MIDDLETON, *Examiner.*

G. E. A. HALVOSA, *Assistant Examiner.*